United States Patent
Redjem-Saad et al.

(10) Patent No.: US 10,018,320 B2
(45) Date of Patent: Jul. 10, 2018

(54) LIGHT MODULE FOR MOTOR VEHICLE HEADLIGHT

(71) Applicant: Valeo Vision, Bobigny (FR)

(72) Inventors: Lotfi Redjem-Saad, Paris (FR); Eric Stefura, Saint-Maur-des-Fosses (FR); Paul Jacquemin, Paris (FR); Brahim El Hachir, Paris (FR)

(73) Assignee: VALEO VISION, Bobigny (FR)

( * ) Notice: Subject to any disclaimer, the term of this patent is extended or adjusted under 35 U.S.C. 154(b) by 263 days.

(21) Appl. No.: 15/083,631

(22) Filed: Mar. 29, 2016

(65) Prior Publication Data

US 2016/0290589 A1    Oct. 6, 2016

(30) Foreign Application Priority Data

Mar. 30, 2015   (FR) ...................................... 15 52665

(51) Int. Cl.
| | |
|---|---|
| *F21S 45/40* | (2018.01) |
| *F21S 41/147* | (2018.01) |
| *F21S 41/29* | (2018.01) |
| *F21S 41/26* | (2018.01) |
| *F21S 41/32* | (2018.01) |
| *F21S 41/47* | (2018.01) |
| *F21S 41/43* | (2018.01) |
| *F21S 45/49* | (2018.01) |

(Continued)

(52) U.S. Cl.
CPC ............. *F21S 45/40* (2018.01); *F21S 41/147* (2018.01); *F21S 41/26* (2018.01); *F21S 41/295* (2018.01); *F21S 41/321* (2018.01); *F21S 41/43* (2018.01); *F21S 41/47* (2018.01); *F21S 45/49* (2018.01); *B60Q 1/12* (2013.01); *F21S 41/192* (2018.01); *F21S 41/657* (2018.01); *F21S 45/33* (2018.01); *F21S 45/47* (2018.01)

(58) Field of Classification Search
CPC .. F21S 45/40; F21S 45/49; F21S 45/33; F21S 45/47; F21S 41/26; F21S 41/295; F21S 41/47; F21S 41/147; F21S 41/321; F21S 41/43; F21S 41/192; F21S 41/657; F21S 41/323; B60Q 1/12
See application file for complete search history.

(56) References Cited

U.S. PATENT DOCUMENTS

| | | | | |
|---|---|---|---|---|
| 4,807,094 | A * | 2/1989 | Mateos | ................... F21S 41/55 362/510 |
| 6,210,024 | B1 * | 4/2001 | Shida | ..................... F21S 41/29 362/345 |

(Continued)

FOREIGN PATENT DOCUMENTS

| | | |
|---|---|---|
| EP | 1681510 | 7/2006 |
| JP | 2008016382 | 1/2008 |
| WO | 2012013591 | 2/2012 |

*Primary Examiner* — Mary Ellen Bowman
(74) *Attorney, Agent, or Firm* — Oblon, McClelland, Maier & Neustadt, L.L.P.

(57) ABSTRACT

A light module comprises two submodules added one against the other and in each of which a light source is associated with an optical deflection element for the deflection of the light rays emitted toward a projection optical device arranged at the output of the module. Each submodule comprises a half-shell forming, in combination with the other half-shell, a space that is enclosed apart from at least one aperture produced in each half-shell to form air circulation cooling means.

20 Claims, 3 Drawing Sheets

(51) Int. Cl.
*B60Q 1/12* (2006.01)
*F21S 41/19* (2018.01)
*F21S 41/657* (2018.01)
*F21S 45/47* (2018.01)
*F21S 45/33* (2018.01)

(56) References Cited

U.S. PATENT DOCUMENTS

| | | | |
|---|---|---|---|
| 9,347,639 B2 | 5/2016 | Thullier et al. | |
| 2004/0202007 A1* | 10/2004 | Yagi | F21V 29/004 362/545 |
| 2005/0094414 A1* | 5/2005 | Ishida | F21S 41/147 362/545 |
| 2009/0316423 A1* | 12/2009 | Futami | F21V 7/0008 362/517 |
| 2011/0222304 A1* | 9/2011 | Tatsukawa | F21S 41/147 362/518 |
| 2013/0170244 A1* | 7/2013 | Thullier | B60Q 1/076 362/516 |
| 2014/0036523 A1* | 2/2014 | Thullier | F21S 48/1388 362/516 |
| 2014/0160781 A1* | 6/2014 | Puente | F21S 48/13 362/516 |
| 2015/0003096 A1* | 1/2015 | Shah | F21S 48/335 362/516 |
| 2015/0292705 A1 | 10/2015 | Thullier et al. | |
| 2017/0023203 A1* | 1/2017 | Sagisaka | F21S 48/328 |
| 2017/0030545 A1* | 2/2017 | Kratochvil | F21S 48/1742 |
| 2017/0343182 A1* | 11/2017 | Chiron | F21S 41/00 |

\* cited by examiner

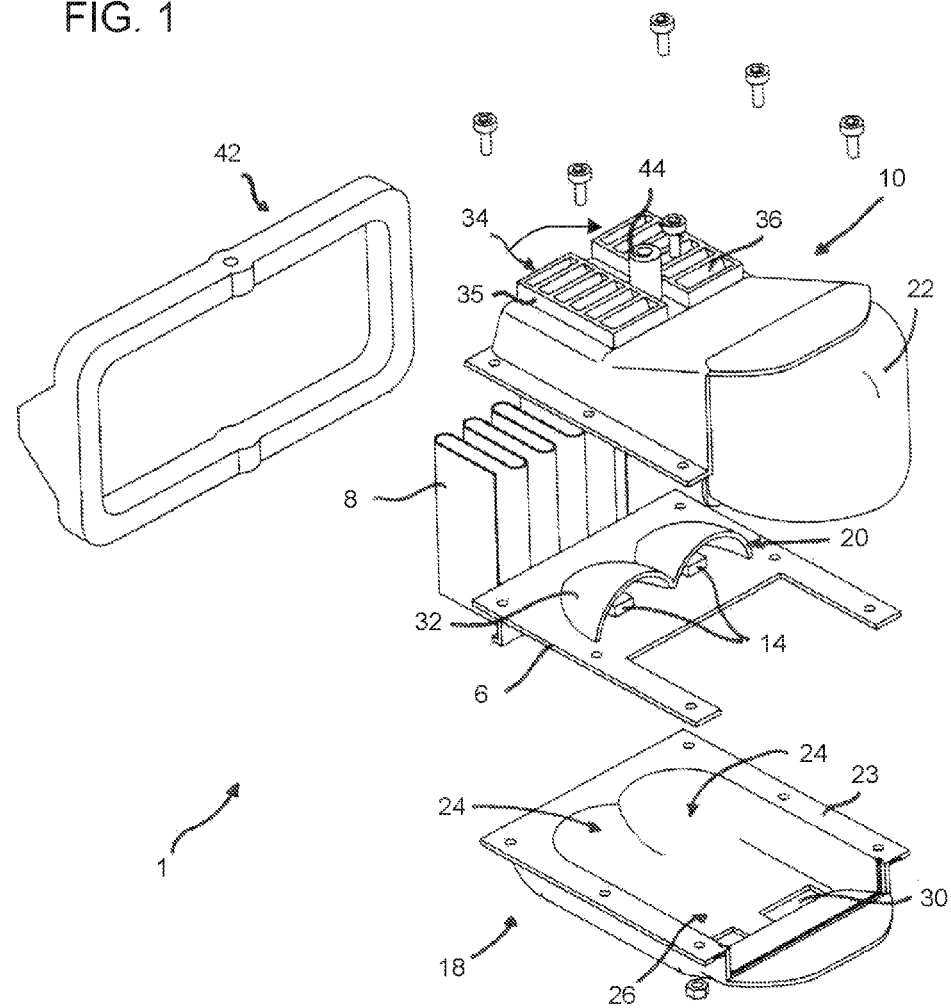
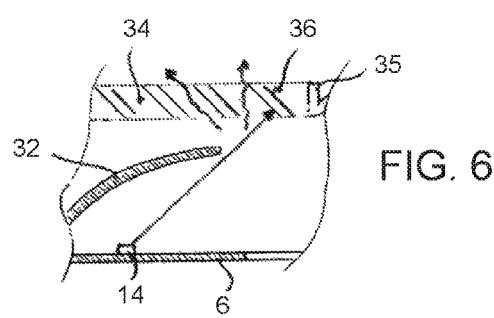

LIGHT MODULE FOR MOTOR VEHICLE HEADLIGHT

CROSS-REFERENCE TO RELATED APPLICATIONS

This application claims priority to the French application 1552665 filed on Mar. 30, 2015, which application is incorporated herein by reference and made a part hereof.

BACKGROUND OF THE INVENTION

1. Field of the Invention

The invention deals with the field of lighting and/or of signaling, notably for motor vehicles. More particularly, the invention deals with the cooling of the light modules producing these lighting and/or signaling functions.

2. Description of the Related Art

A motor vehicle is equipped with headlights, intended to illuminate the road in front of the vehicle, at night or in conditions of a reduced brightness, by a global light beam. These headlights comprise one or more light modules adapted to generate and direct an intermediate light beam, the addition of which forms said global light beam.

Light modules are known that are formed by two half-shells assembled on a planar support and respectively bearing optical deflection means for the light rays emitted by a light source associated with each half-shell. The rays are deflected toward a projection optical device arranged at the output of the light module. Depending on the light source which is on, a beam is thus produced as the output of the light module that is suitable for creating a high-beam type light, more strongly illuminating the road scene but with the risk of dazzling an oncoming driver, or a low-beam type light, in which the beam is concentrated in front of the vehicle to avoid this type of dazzle.

It has been observed over a number of years that the use of light-emitting diodes as light sources has become widespread in the headlights installed in motor vehicles. Now, it is known that the optical performance of such an assembly can be a function of the operating temperature of the light-emitting diode.

It has also been observed that plastic materials, for example polycarbonate plastic, is being used increasingly regularly for the production of the half-shells forming these light modules, and that this also falls within a context of light module bulk reduction. The combination of these characteristics of compactness, of materials and of use of heat-generating diodes promotes a heating-up of the device that is not compatible with the desired optical performance. A confinement of the hot air between the reflector of the top half-shell and the planar support of the associated light source is in particular observed.

SUMMARY OF THE INVENTION

One objective of the invention is to propose a light device as has just been described and in which the temperature is controlled to avoid impacting the diode performance levels.

To this end, the subject of the invention is a light module comprising two submodules added one against the other and in each of which a light source is associated with an optical deflection element for the deflection of the light rays emitted toward a projection optical device arranged at the output of the light module. Preferably, the two light sources are positioned substantially in the same optical plane and respectively associated with an optical deflection element suitable for deflecting, on an optical axis, the rays emitted by these sources toward a projection arranged at the output of the light module. According to the invention, the light module comprises two half-shells assembled relative to one another by being positioned on either side of the optical plane, at least one of the two half-shells comprising at least one aperture forming air circulation cooling means. The half-shells are assembled so as to form an enclosed space for the optical efficiency of the light module and the good transmission of the light rays, and apertures are provided in this enclosed space to produce a circulation of air which allows the hot air that usually stagnates in the light module to be discharged.

The light module according to the invention can be arranged such that the first half-shell is positioned under the second half-shell, the optical deflection element associated with the first half-shell being arranged therein to produce a lighting beam of rays of high-beam type whereas the optical deflection element associated with the second half-shell is arranged therein to produce a lighting beam of rays of low-beam type.

In an advantageous embodiment, the cooling means borne by the first half-shell take the form of at least one opening passing through the thickness of the first half-shell to allow the passage of air. Also, the optical deflection element corresponding to the first half-shell is formed by the reflecting inner face of this first half-shell, characterized in that the at least one opening is produced transversely to the optical axis along the border of this reflecting inner face. Thus, the cooling means are situated as close as possible to the optical deflection element for cool air to enter into the dome, between the optical deflection element and the support plate, and without that hampering the reflection of the rays.

Provision will be able to be made for the aperture to have a width of between 5 mm and 8 mm, and for it to have a length at least equal to 15 mm. The aim is thus to provide a sufficient aperture for the circulation of air, but which does not penalize the structural strength of the light module.

According to different variant embodiments, provision will be able to be made for the aperture in the first half-shell to be produced continuously by a single opening, or else for the aperture to be discontinuous, formed by a plurality of side-by-side adjacent openings. In the latter case, the aperture is advantageously produced by two openings positioned in series transversely to the border of the reflecting inner face. Here again, it is advantageous for the apertures forming the cooling means to be situated as close as possible to the optical deflection element for the cool air to penetrate into the dome, between the optical deflection element and the support plate, and without that hampering the reflection of the rays.

According to features specific to the production of the second half-shell, which can be taken alone or in combination with the features specific for the production of the first half-shell, provision is made for the cooling means borne by the second half-shell to take the form of at least one aperture passing through the thickness of the half-shell to allow the passage of air.

Provision will be able to be made for the optical deflection means to be formed by the reflecting inner face of the second half-shell, the aperture being produced at the border of this reflecting inner face, or else for the second half-shell to form a protective cover for a reflector produced separately from the second half-shell and forming the optical deflection element, the aperture produced in the half-shell extending substantially above the reflector.

In an advantageous embodiment, the apertures forming the cooling means comprise rigidifying ribs positioned transversely in the aperture. The ribs can have an inclination in relation to the vertical and transverse plane, for example by an angle of 45°, so as to extend toward the rear of the light module, opposite the projection optical device, from the interior of the light module toward the exterior thereof. Provision will be able to be made for two openings to extend longitudinally side by side to form the aperture, two distinct rows of ribs being respectively positioned in an opening.

According to different features of the invention, taken alone or in combination:

the light sources are light-emitting diodes;

the cooling means are positioned symmetrically in relation to a vertical plane passing through the optical axis;

the light module is mounted to rotate about an axis, the cooling means being arranged around this axis.

The invention also relates to a motor vehicle headlight in which at least one light module as has just been described previously is provided.

These and other objects and advantages of the invention will be apparent from the following description, the accompanying drawings and the appended claims.

BRIEF DESCRIPTION OF THE ACCOMPANYING DRAWINGS

Other features and advantages of the present invention will become more clearly apparent from the description and the drawings in which:

FIG. 1 is a schematic representation of a light device according to the invention, in an exploded view showing different elements that make up the device, including a bottom half-shell, a light-emitting diode support plate and a heat sink, a top half-shell, and a projection optical device of lens type;

FIG. 6 is a detail view of the apertures in which wavy line arrows illustrate the air leaving the module and a straight line arrow illustrates a light ray emitted in the light module.

DETAILED DESCRIPTION OF THE PREFERRED EMBODIMENTS

Figure 2:
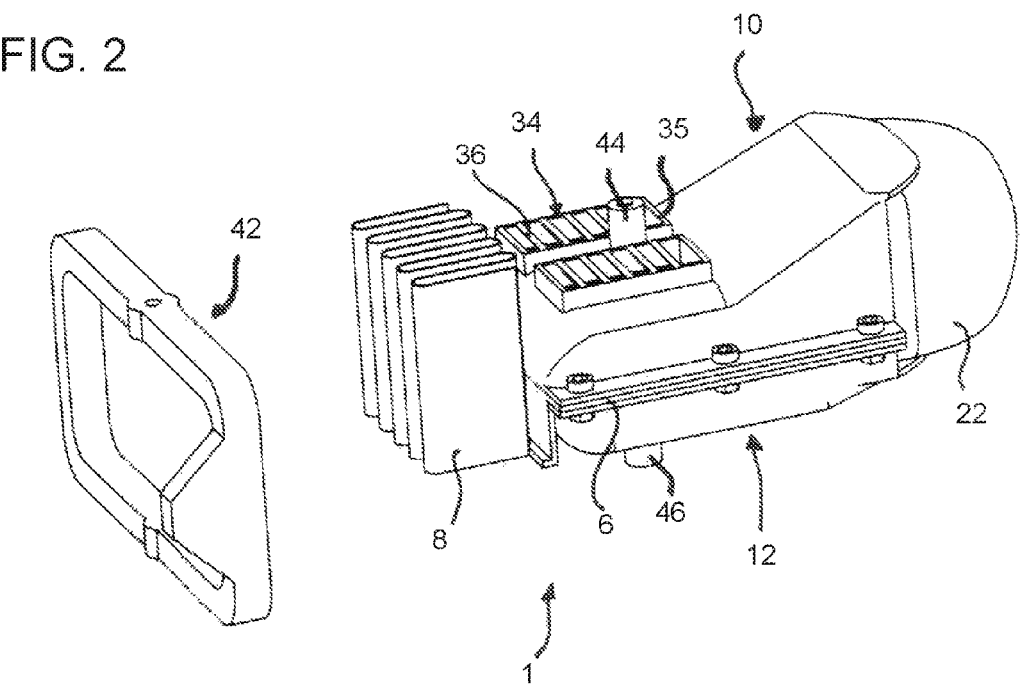
FIG. 2 is a view of the assembled device, front three-quarter view from above.
Figure 3:
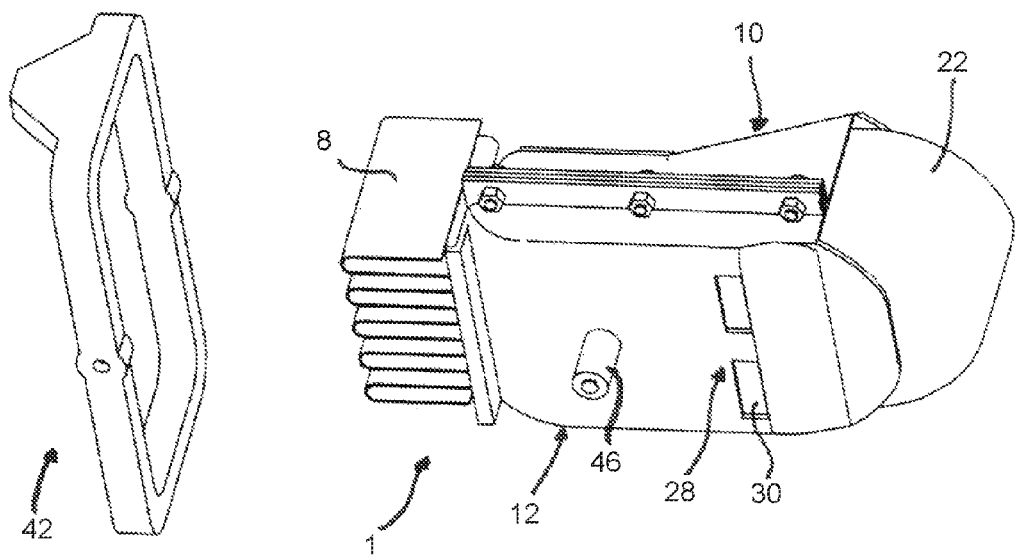
FIG. 3 is a view of the assembled device, front three-quarter view from below.
Figure 5:
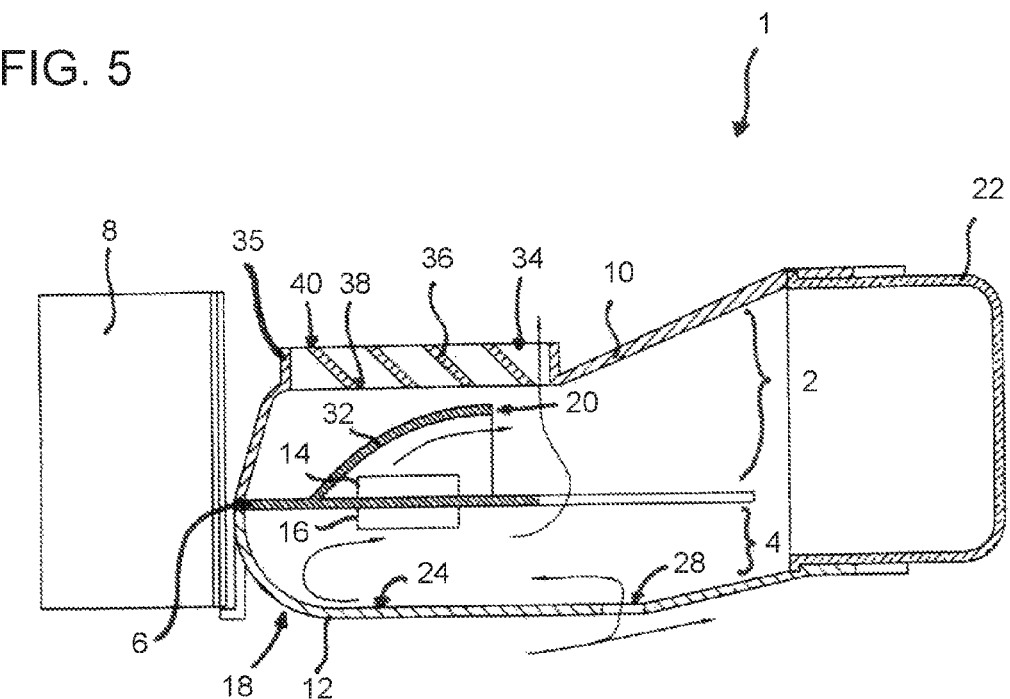
FIG. 5 is a cross-sectional view in a median vertical plane of the device in which arrows illustrate the path of the air circulating in the light module.
Figure 4:
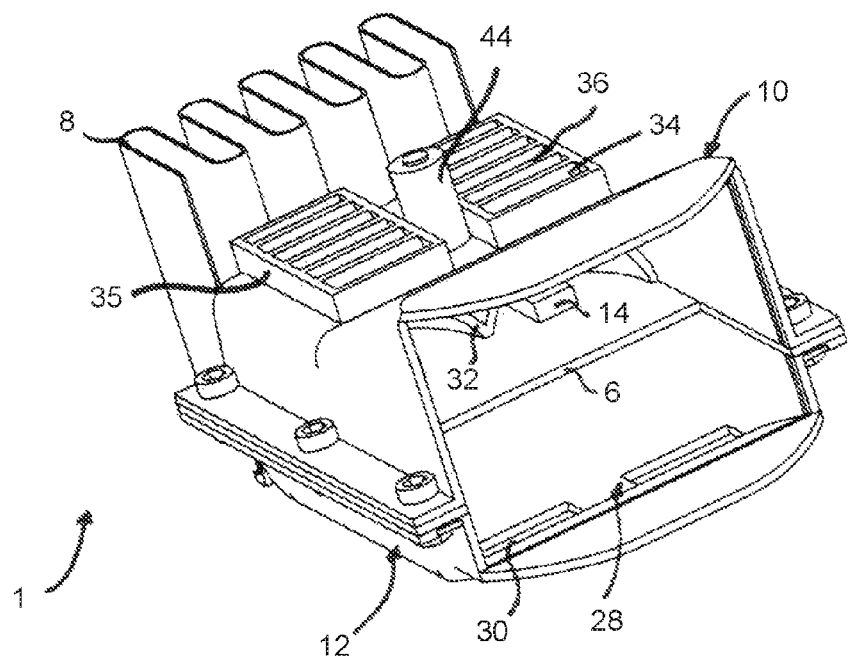
FIG. 4 is a view similar to that of FIG. 2 in which the lens has been removed to reveal both the apertures formed in the bottom half-shell and those formed in the top half-shell.

The light module 1 according to the invention will first of all be described, relying notably on FIGS. 1-6, in which it emerges that the light module 1 is formed by two submodules 2, 4 (FIG. 5) added one against the other. They are positioned one under the other, on either side of a central support plate 6. The support plate 6 bears, at one end, heat exchange cooling fins forming a heat sink 8. Each submodule 2, 4 comprises a half-shell 10, 12 which is fixed onto the support plate 6, a light source 14, 16 which is positioned on the face of the support plate 6 which is turned toward the corresponding half-shell 10, 12 so as to be able to emit light rays toward this half-shell 10, 12. Each submodule 2, 4 further comprises an optical deflection element 18, 20 and the light module 1 comprises a projection optical device 22 borne by the free ends of the half-shells 10, 12, the assembly being arranged such that, for each submodule 2, 4, the rays emitted by the light sources 14, 16 are reflected by the associated optical deflection element 18, 20 toward the projection optical device 22. Here, the projection optical device 22 is a projection lens.

The half-shells 10, 12 will be described herein below according to the orientation of the light module 1 illustrated in particular in FIG. 2, in which a second half-shell 10 is positioned above a first half-shell 12, such that, in the following example, the concepts of first half-shell 10 and of bottom half-shell, as well as those of second half-shell 12 and of top half-shell, will be comparable.

The first half-shell 12 or bottom half-shell is produced in a plastic material of polycarbonate type, and it comprises, at its periphery, a frame 23 for fixing to the support plate 6 and, at its center a curved wall having a substantially ellipsoidal profile. The first half-shell 12 houses, inside the dome and formed between the half-shell 12 and the support plate 6, a light source 16 formed by a light-emitting diode added under the support plate 6. It will be understood that if, as is illustrated, the first half-shell 12 has a double ellipsoidal profile, two diodes will be provided for each ellipsoid to be illuminated specifically by one of the diodes.

The optical deflection element 18 (FIG. 1) is produced directly by a part of the inner surface 24 of the bottom half-shell 12. A specific coating of the inner surface is produced in a reflecting material, over all or part of the first half-shell 12. Advantageously, the coating is produced over a part of the first half-shell 12, from its end added against the support plate 6 to a central zone 26, substantially in line with the end of the support plate 6.

The light source 16 and the optical deflection element 18 are arranged such that the rays emitted by the light source 16 are deflected by the reflecting surface toward the projection optical device 22, so as to form a high-beam type light beam.

The first half-shell 12 comprises first cooling means, complementing second cooling means also borne by the second half-shell 10. These first cooling means are formed by an aperture 28 produced in the central zone of the first half-shell 12, at the border of the reflecting surface.

In the embodiment illustrated, the aperture 28 is formed by two openings 30 positioned in series in the transverse direction, that is to say at right angles to the optical axis. Each opening 30 passes through the thickness of the first half-shell 12 such that the air can penetrate into the light module 1 from the outside thereof.

Each opening 30 has a substantially rectangular form with a width which extends longitudinally between 5 mm and 8 mm, and a length which extends transversely over at least 15 mm, to allow the sufficient entry of air without in any way penalizing the structural strength of the assembly.

The embodiment illustrated, with two distinct openings 30 positioned transversely in series to form the aperture, is advantageous in that it allows for an offset symmetrical production which facilitates the central injection of material when producing the first half-shell 12. It will be understood that other arrangements, in terms of number and/or form, of openings to form this aperture will be able to be provided.

The second half-shell 10 forms part, with the light source 14 positioned on the top face of the support plate 6, of an upper submodule 2 suitable for generating, as output, a light beam of low-beam type. The rays emitted are reflected by the second optical deflection element 20 toward the projection lens, and a shield is positioned on the path of the rays such that, as is known to those skilled in the art, the beam is cut and the light output from the headlight forms low beams which do not dazzle other users.

In the embodiment described, the second optical deflection element 20 is produced independently of the second half-shell 10. The latter is produced in a plastic material of polycarbonate type, and it is fixed onto the support plate 6 so as to cover the second optical deflection element 20 that is formed by a reflector 32 which is also fixed onto the support plate 6.

The reflector 32 has an inner face, the coating of which is suitable for reflecting the light emitted by the light source 14, the reflector 32 being positioned facing the light source 14. As illustrated, the reflector 32 can be double, that is to say that it can have a form with a number of ellipses, and in this case the light source 14 is provided for each elliptical form of the reflector 32.

The second cooling means are borne by the second half-shell 10. They consist here of two apertures 34 positioned side by side and extending longitudinally. Each aperture 34 is delimited by a peripheral edge 35 extending, by vertical protuberance, the wall of the second half-shell 10, and rigidifying ribs 36 extend transversely from one side to the other of the aperture 34. These second cooling means are particularly illustrated in FIGS. 5 and 6, in which it is notable that the ribs 36 have an inclination in relation to the transverse and vertical plane. An inclination by an angle substantially equal to 45° is for example provided, such that the ribs 36 extend, from their bottom end 38 turned toward the interior of the light module 1 to their top end 40 turned toward the exterior of the light module 1, toward the rear of the light module 1. "Toward the rear of the light module 1" should be understood to mean in the direction opposite the direction of emission of the rays at the output of the light module 1. Advantages of this inclination of the ribs 36 and of this orientation are illustrated in FIG. 6. The ribs 36 thus have a surface substantially at right angles to the direction of emission of the light rays which have been emitted by the light source 14 but which have escaped the deflector, such that the ribs 36 block the propagation of these light rays and they allow a good optical efficiency because there is no leak of rays in a context in which apertures are made for the cooling by air circulation. The number of the ribs 36, here four, the inclination of the ribs 36, here 45°, and the height of the ribs 36 are notably determined for the bottom end 38 of each rib 36 to be clear longitudinally in relation to the top end 40 of the adjacent rib 36, such that the discharge of hot air can occur vertically without obstacle.

As illustrated in the figures, provision can be made for the first cooling means ensuring the entry of cold air into the light module 1 to be under-dimensioned in relation to the second cooling means ensuring the output of hot air. It is advantageous to provide an aperture dedicated to the entry of air which is small in order to increase the speed of entry of air into the light module 1. The shrinkage of section on the flow of air causes thereby an increase in the speed of this flow which makes it possible to rapidly scavenge the air in the hot cavity of the bottom half-shell 12 of the light module 1. And it is advantageous to increase the size of the second cooling means in order to discharge a significant volume of hot air, since, by heating up, the air inside the light module 1 undergoes a slight expansion.

The light module 1 is, in the embodiment illustrated, mounted to pivot substantially horizontally, notably so that the projected beam can follow the curve of the road in bends. This directional lighting functionality is known by the acronym DBL, standing for "Dynamic Bending Light". To this end, the light module 1 is mounted on a corresponding support 42, via a first bearing 44 secured to the second half-shell 10 and a second bearing 46 secured to the first half-shell 12, and a rotational driving motor (not represented) is provided to generate the pivoting of the light module 1 about the axis defined by the alignment of the bearings 44, 46. It will be understood that, for vehicles that do not offer directional lighting, the light module 1 will be able to be mounted in a fixed manner on a housing of the headlight.

In a variant that is not represented, provision will be able to be made for the second half-shell 10 to be produced substantially like the first half-shell 12, with a single piece which acts as shell and as reflecting surface through treatment of its inner surface.

The above description clearly explains how the invention makes it possible to achieve the objectives set for it and in particular to propose a particularly compact light device or light module 1 suitable for being housed in a confined environment, without that generating an overheating detrimental to the photometric efficiency of the device. Through the creation of cooling means according to the invention, a natural convective air current is created between a cold bottom point and a hot top point urging the air contained between the optical deflection element 18 of the top half-shell 10 and the heat sink to be discharged through the top aperture.

Obviously, various modifications can be made by those skilled in the art to the structure of the light module which has just been described by way of non-limiting example, since there are created, in a context of light module closed to avoid the leakage of light rays, thermal cooling means through apertures allowing a circulation of cool air in the light module 1. The embodiments which have been described in detail above are in no way limiting the invention. A light device according to the invention has been described with a half-shell intended to produce low beams which is placed above the half-shell intended to produce high beams, and it will be understood that the use of the air circulation cooling means in a light module applies also to light modules in which the half-shells are arranged differently in relation to one another. In any case, the invention will not be limited to the embodiment specifically described in this document, and extends in particular to all equivalent means and to any technically feasible combination of these means.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light module comprising a first submodule and a second submodule added one against the other and in each of which a light source is associated with a first optical deflection element and a second optical deflection element for the deflection of the light rays emitted toward a projection optical device arranged at an output of said light module, wherein each submodule comprises a first half-shell forming, in combination with a second half-shell, a space that is enclosed apart from at least one aperture produced in each half-shell to form air circulation cooling means.

2. The light module according to claim 1, wherein said first submodule is positioned under said second submodule, said first optical deflection element associated with said first submodule being arranged therein to produce a beam of rays of high-beam type whereas said second optical deflection element associated with said second submodule is arranged therein to produce a beam of rays of low-beam type.

3. The light module according to claim 1, wherein in said first submodule, said first optical deflection element is formed by a reflecting inner face of said first half-shell, said at least one aperture forming first cooling means borne by said first half-shell taking the form of at least one opening passing through the thickness of said first half-shell to allow the passage of air.

4. The light module according to claim 3, wherein said at least one opening is produced transversely along the border of said reflecting inner face.

5. The light module according to claim 3, wherein said at least one aperture has a width of between 5 mm and 8 mm.

6. The light module according to claim 3, wherein said at least one aperture has a length at least equal to 15 mm.

7. The light module according to claim 3, wherein said at least one aperture is produced continuously by a single opening.

8. The light according to claim 3, wherein said at least one aperture is discontinuous, formed by a plurality of side-by-side adjacent openings.

9. The light module according to claim 8, wherein said at least one aperture is produced by said plurality of side-by-side adjacent openings positioned in series transversely to the border of said reflecting inner face.

10. The light module according to claim 1, wherein in said second submodule, second cooling means borne by said second half-shell take the form of at least one aperture passing through the thickness of said second half-shell to allow the passage of air.

11. The light module according to claim 10, wherein said second optical deflection element is formed by a reflecting inner face of said second half-shell, and in that said at least one aperture is produced at the border of said reflecting inner face.

12. The light module according to claim 10, wherein said second half-shell forms a protective cover for a reflector produced separately from said second half-shell and forming said second optical deflection element, said at least one aperture produced in said second half-shell extending substantially above said reflector.

13. The light module according to claim 12, wherein said second cooling means comprise rigidifying ribs positioned transversely in said at least one aperture.

14. The light module according to claim 13, wherein said ribs have an inclination in relation to the vertical and transverse plane so as to extend toward the rear of said light module, opposite said projection optical device, from the interior of said light module toward the exterior thereof.

15. The light module according to claim 13, wherein two openings extend longitudinally side by side to form said at least one aperture, two distinct rows of ribs being respectively positioned in an opening.

16. The light module according to claim 1, wherein said light sources are light-emitting diodes.

17. The light module according to claim 1, wherein said cooling means are positioned symmetrically in relation to a vertical and longitudinal plane.

18. The light module according to claim 1, wherein said light module is mounted to rotate about an axis, said cooling means being arranged around said axis.

19. A motor vehicle headlight with at least one light module according to claim 1.

20. The light module according to claim 2, wherein in said first submodule, said first optical deflection element is formed by a reflecting inner face of said first half-shell, said at least one aperture forming first cooling means borne by said first half-shell taking the form of at least one opening passing through the thickness of said first half-shell to allow the passage of air.

* * * * *